Figures 1, 2:
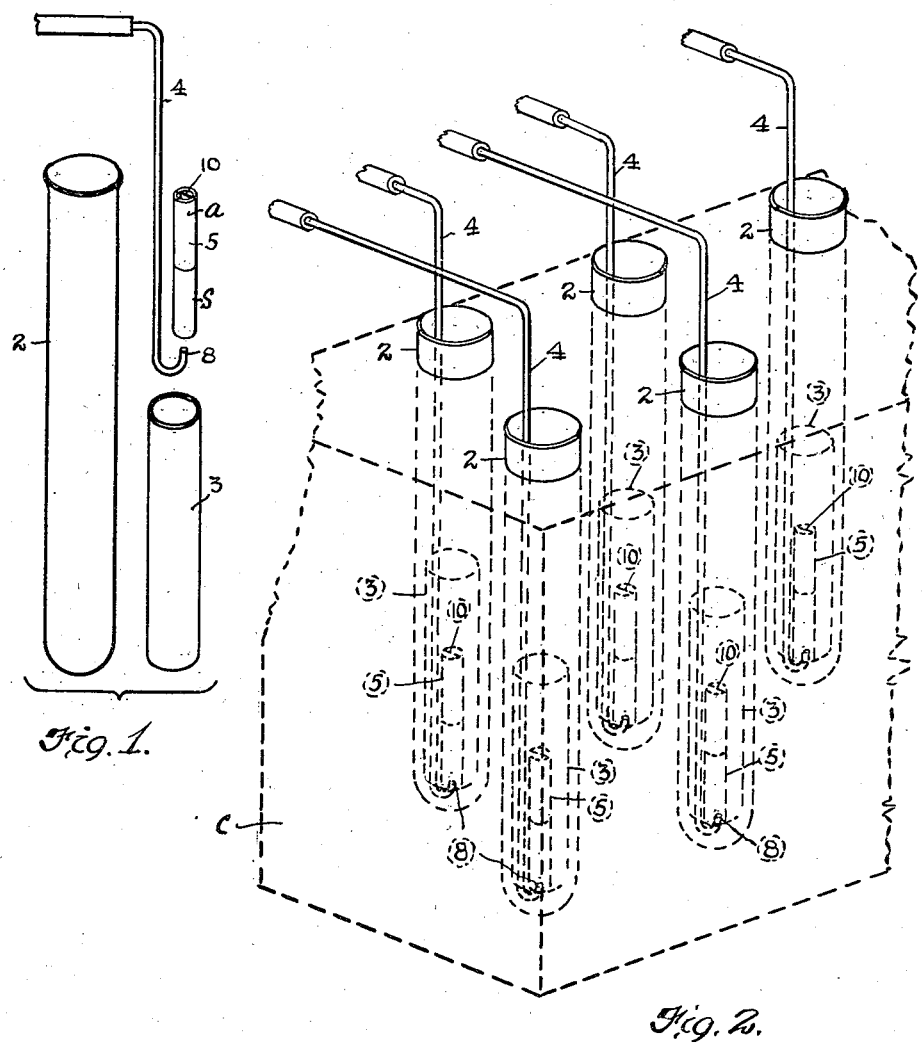

April 27, 1943. R. E. BURK ET AL 2,317,950
OIL TESTING APPARATUS
Filed April 25, 1940

INVENTORS
Robert E. Burk and
BY Everett C. Hughes.
Oberlin, Limbach & Day
ATTORNEYS.

Patented Apr. 27, 1943

2,317,950

UNITED STATES PATENT OFFICE 2,317,950

OIL TESTING APPARATUS

Robert E. Burk, and Everett C. Hughes, Cleveland Heights, Ohio, assignors to The Standard Oil Company, Cleveland, Ohio, a corporation of Ohio Application April 25, 1940, Serial No. 331,624

4 Claims. (Cl. 73—51)

It has long been known to chemists that different oils while in service in lubricating usages and in transformers etc. perform quite differently in their proclivities to change. Particularly for instance, tendencies to viscosity change and tendencies to formation of sticky deposits commonly called "lacquer" by oil chemists, have been difficult to evaluate or correlate with an oil. Various tests have been proposed and are in use, and it is well recognized by chemists that these have shortcomings, which in all cases are serious, and in many instances are such as to largely nullify the utility of routine testing. Most of the known tests recognize the utility of heat, and some recognize the utility of air exposure, but withal the laboratory tests have not been desirably dependable, and for real information as to the service performance of an oil it has been necessary to resort to engine tests. These have generally been made by long-time runs with the oil in an engine, which in some cases is selected as a practically-known severe type of engine as regards its behavior on oils, and in other instances special test engines have been employed. The first-mentioned type of engine has had the serious drawback that dismantling, as required for each oil test run and for cleaning has been laborious and costly, such engines not having been designed for frequent take-down. Of the second-mentioned type of engines, some have been designed for easy take-down, but all have had the very serious disadvantage of requiring a large amount of oil for each test, besides being very time-consuming, and permitting a test of only one oil at a time. We have found that an important reason why it has not heretofore been possible to correlate laboratory tests with actual service conditions or with engine test runs has come from the fact that the various laboratory tests devised have omitted or failed to give quantitative consideration to factors which actually have considerable weight in practice. For instance, an oil in service is in contact with various metals. We have found that these, and some of them in particular, under service conditions exert very considerable catalytic action, determining what character the breakdown will be liable to take, and also the extent. In accordance with our invention a convenient laboratory test of an oil may be made such as to include all of the factors encountered by the oil in actual service, and furthermore these factors can be adjusted in absolute and in relative relation such as to correlate the test with service performance, and permit the taking account of the close conditions under which an oil may have to operate in any service. Furthermore, a large number of tests may be carried on simultaneously under standard conditions, a matter of great advantage and convenience to the testing chemist in distinction from the very restricted testing heretofore possible.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:

Fig. 1 is a perspective view showing the internal elements of testing equipment in accordance with the invention, the elements being disassembled or separated for clearer showing; and Fig. 2 is a perspective view of an assembly embodying apparatus in accordance with the invention.

The variables which are concerned in service performance, and which are controlled in testing oil in accordance with the present invention, are temperature, time, catalytic surfaces, area and shape and placement thereof, rate of air exposure, and composition of air supply (such as whether containing engine blow-by materials or being deficient in oxygen), and flow of oxygenated oil over catalytic surfaces. In the present method the variables are controlled and co-adjusted to correlation with conditions of service, as for instance internal combustion engine operating conditions, and the test results thus obtained are in correlation with actual engine runs or practical service.

The oil to be tested, as for example an internal combustion engine lubricating oil, is taken in a selected amount, which is in correlation with the factors involved in the test, and while the amount of oil can be larger or smaller, the factors correspondingly correlated, we prefer in general a test charge of 150 cc., such an amount under proper conditions being found to give as satisfactory results as where considerably larger amounts have been employed. The test-charge is placed in a container, which as illustrated in Fig. 1, is a tube 2, as of "pyrex" glass, and desirably dimensioned about 32 cm. long and 45 mm. outside diameter, the bottom being smoothly rounded for easy cleaning. Within this is placed a catalytic surface element 3, which in the form of a cylinder or sleeve takes up relatively little space and its dimensions can be correlated. The catalytic metals to which oils are customarily exposed are iron in the form of cast iron or steel (carbon-containing in both cases), aluminum, copper, brass, babbitt, cadmium-silver alloys, antimony, zinc, nickel, chromium, lead, tin, (in minor amounts), and minor constituents of alloy steels or cast irons. Extensive experimentation and correlation has shown that of these, copper, aluminum and iron are outstandingly important in their action and effects. The catalytically-active component of brass is again the copper. Practical testing thus provides by our method a correlated reproduction of such catalytic surfaces in relation with the oil, as in service conditions. The other metals noted, of much lesser catalytic activity and importance are also taken account of in testing for special service conditions or usages, where involved. In our equipment then, the catalytic element 3, where the testing is to be directed to internal combustion engine oils, is of steel tubing. The extent of area of this may be correlated to the charge of oil, and for instance in the case of taking 150 cc. as a convenient standard charge, the catalytic sleeve for the iron component may be about 18½ cm. long and 38 mm. outside diameter. Withh the iron component catalytic sleeve and the charge of oil in the container 2, an air injector 4 is inserted, this being dimensioned such as to set down to the bottom within the catalytic sleeve, and in the assembly there is provided a circulating passageway system involving the catalytic sleeve 3 afore-mentioned, and a further catalytic sleeve 5 of smaller diameter to set therewithin, the arrangement of concentric walls and air bubbling from below forming a circulating deflector system such that the oil during the test is flowed over the catalytic surfaces. The metal of the catalytic element 5 will depend upon the service conditions to be tested for, and may be correlated thereto, and for instance in the case of testing for internal combustion engine lubricating oils for use with engines of prevalent type involving aluminum pistons and brass surfaces at certain other points, would be correlated by forming the sleeve 5 half of steel tubing and half of aluminum, and consistent with the dimensions of the elements so far illustratively stated, this may have a length of about 14 cm. and an outside diameter of 13 mm. and inside diameter of 10 mm. This sleeve 5, it will be observed is of such dimension also as to allow seating and positioning over the tip 8 of the air injector. Within the catalyst sleeve 5 the copper component may be provided in the form of a partition 10 about 10 cm. long in the upper part of the tube. This in such manner presents its surface to the circulating oil and at the same time is a part of the chimney circulating system. With the assemblage of the air injector 4 carrying the inner sleeve 5 within the outer sleeve 3 in the container 2, and the whole maintained at a testing temperature, as referred to hereinafter, air is blown in at a controlled rate. The air feed may be supplied by any desired means, and its rate may be selected in accordance with conditions to be correlated for the test. For a test thus on a charge amount of oil as above-illustratively noted and for prevalent comparative engine conditions, an air feed rate of about 30 liters per hour is suitable. This may be changed within wide limits of course, in accordance with needs of testing for any special conditions as desired. And the oil may be subjected to the action of heat and catalytic surfaces and air exposure in any combination of a portion or all of these factors, such as to be exactly reproducible on different samples, and to provide respective conditions for oil breakdown as dictated in view of the kind of oil and any particular kind of service conditions involved for comparison. With this apparatus also, a large number of samples can be run simultaneously, the factors being arranged the same or variedly as desired. Rapidity and relatively low cost on tests is thus realized. Where desired, the air which is to be bubbled through the oil may be passed through a filter to remove dust etc., then through alkali to remove $H_2S$, $CO_2$, etc., then through acid, and a filter, such as glass wool.

In some tests, the oil is allowed to stand in contact with the catalyst metal for stated times, e. g. to twenty-four hours, before the air is turned on; or the air may be omitted entirely.

In the operation of making a determination on an oil, the procedure illustratively is as follows: The catalytic pieces which are to be employed, for example an outer steel sleeve 3 having a surface of 200 square cm. and a composite sleeve 5 having a steel surface s and an aluminum surface a of 100 square cm. each, and a copper partition 10 having a surface of 100 square cm., having been polished cleanly are assembled in the container 2 with the air jet 4 and 150 cc. for instance of the oil to be tested. The container is placed in the constant temperature holder C, which may be a suitable thermostatically controlled oil bath or bath of molten metal of low melting point, molten salts, etc., or a block of heat-conducting solid metal with recesses within which the containers 2 fit to be heated thereby. The heating may be of any desired source, conveniently electric tubular or strip heaters suitably applied to the bath or in bores through the block where a solid metal heated block is used, and the heater being in circuit with a thermostat sufficiently centrally placed to afford proper control. The oil having attained the temperature predetermined for the test, for example 300° F., the air is turned on and with a flow meter or regulator is run at an adjusted selected rate, for instance 30 liters per hour. The oil is thereby circulated in free and thorough exposure to the catalytic surfaces for the desired length of time, for instance sixty-five hours. The catalytic elements are then drained and are washed with a straight run naphtha to remove oil without disturbing the lacquer or varnish-like sticky material which has formed thereon, and after standing for thirty minutes to complete evaporation of any residual naphtha, the catalytic elements are weighed. Then the lacquer or varnish deposit is dissolved off by a solvent, as for instance a 2:1 mixture by volume of acetone and toluene, are gently wiped dry, allowed to stand for thirty minutes and are weighed again. The difference in weight is the lacquer deposit formed by the oil. The metal pieces may in some cases be cleaned by burnishing. The oil in the container having been cooled down may then have determinations made for its viscosity, acid number and sludge, as desired, the viscosity being taken for instance on the Saybolt Universal viscosimeter, and the acid number and the sludge in well-known manners.

Other modes of applying the principle of the invention may be employed, change being made as regards the details described, provided the features stated in any of the following claims, or the equivalent of such, be employed.

We therefore particularly point out and distinctly claim as our invention:

1. Means for testing oils, comprising a non-catalytic container for a selected amount of the oil, a jet for injecting air thereinto at a controlled rate, a circulating passway system including an outer catalytic sleeve of steel, an ing an outer catalytic sleeve sleeve of steel, an inner catalytic sleeve of steel and aluminum and a copper divider therein, and means for maintaining the container and contents at a selected elevated temperature.

2. Means for testing oils, comprising a non-catalytic container for a sample of the oil, a jet for injecting air thereinto at a controlled rate, a circulating passway system including an outer catalytic sleeve of steel, an inner catalytic sleeve with a copper divider therein, and means for maintaining the container and contents at a selected elevated temperature.

3. Means for testing oils, comprising a non-catalytic container for a sample of the oil, means for maintaining the same at a selected uniform temperature, a circulating passway including a sleeve providing selected catalytic surfaces, and a circulating air jet directed upwardly at the lower end of the sleeve.

4. Means for testing oils, comprising a container for a sample of the oil, a catalytic cylinder within the container open at both ends and spaced from the container wall to provide a circuit within the container through and about the cylinder, agitating means in the container, and means for maintaining the container contents at a selected temperature.

ROBERT E. BURK.
EVERETT C. HUGHES.

CERTIFICATE OF CORRECTION.

Patent No. 2,317,950. April 27, 1943.

ROBERT E. BURK, ET AL.

It is hereby certified that error appears in the printed specification of the above numbered patent requiring correction as follows: Page 3, first column, line 9-10, claim 1, strike out "an ing an outer catalytic sleeve sleeve of steel,"; and that the said Letters Patent should be read with this correction therein that the same may conform to the record of the case in the Patent Office.

Signed and sealed this 1st day of June, A. D. 1943.

(Seal)

Henry Van Arsdale,
Acting Commissioner of Patents.